United States Patent
Li

(10) Patent No.: US 6,629,492 B1
(45) Date of Patent: Oct. 7, 2003

(54) JUICER HAVING A SAFE POWER CONNECTION FUNCTION

(76) Inventor: Wen-Jing Li, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/314,759

(22) Filed: Dec. 6, 2002

(51) Int. Cl.[7] .............................. A23N 1/00; A47J 43/08; A47J 27/00; A47J 27/09; B02C 15/00
(52) U.S. Cl. .............................. 99/337; 99/348; 99/492; 99/510; 366/205; 366/206; 366/314; 366/601; 241/37.5; 241/92
(58) Field of Search ..................... 99/337, 338, 342, 99/348, 492, 509, 510, 511–513; 241/36, 37.5, 92, 282.1, 282.2, 280; 366/96–98, 100, 197, 205, 206, 314, 601; 200/302.1–302.3; 361/195–203; 219/492, 494, 442, 506, 486; 318/811, 772; 700/90

(56) References Cited

U.S. PATENT DOCUMENTS

| | | | | |
|---|---|---|---|---|
| 3,548,280 A | * | 12/1970 | Cockroft | 366/601 |
| 3,809,325 A | * | 5/1974 | Marrie | 366/206 X |
| 4,487,509 A | * | 12/1984 | Boyce | 366/199 |
| 4,568,193 A | * | 2/1986 | Contri et al. | 366/206 |
| 4,681,030 A | * | 7/1987 | Herbert | 99/484 |
| 4,921,174 A | * | 5/1990 | Okada et al. | 366/601 X |
| 4,921,175 A | * | 5/1990 | Okada et al. | 241/37.5 |
| 4,941,403 A | * | 7/1990 | Cimenti | 99/510 X |
| 5,031,518 A | * | 7/1991 | Bordes | 366/314 X |
| 5,184,893 A | * | 2/1993 | Steele et al. | 366/209 |
| 5,316,382 A | * | 5/1994 | Penaranda et al. | 99/348 X |
| 5,347,205 A | * | 9/1994 | Piland | 366/206 X |
| 5,556,198 A | * | 9/1996 | Dickson, Jr. et al. | 366/601 |

* cited by examiner

*Primary Examiner*—Timothy F. Simone

(57) ABSTRACT

A juicer having a safe power connection function includes a motor seat, a fixing ring, a container, an electric wire, a conductive switch, and a top cover. Thus, when the top cover is not mounted on the top of the container rigidly and stably and when the press member of the conductive switch is not in contact with the conductive member of the conductive switch, the motor will not be driven to operate, so as to prevent the cutter blades from being rotated due to unintentional touch of the control switches, thereby preventing the user from being injured, and thereby protecting the user's safety.

8 Claims, 5 Drawing Sheets

JUICER HAVING A SAFE POWER CONNECTION FUNCTION

BACKGROUND OF THE INVENTION

1. Field of the Invention

The present invention relates to a juicer having a safe power connection function, and more particularly to a juicer having a safe power connection function, wherein when the top cover is not mounted on the top of the container rigidly and stably and when the press member is not in contact with the conductive member, the motor will not be driven to operate, so as to prevent the cutter blades from being rotated due to unintentional touch of the control switches, thereby preventing the user from being injured, and thereby protecting the user's safety.

2. Description of the Related Art

A conventional juicer in accordance with the prior art comprises a motor seat having a control panel provided with a plurality of control switches, such as the rotation speed control switch, the start switch or the like. Thus, the user can press the control switches on the control panel of the motor seat, so as to start the start switch of the electric power, so that the motor mounted in the motor seat is driven to operate to rotate the cutter blades contained in the container, so as to perform the function of the juicer.

However, if the top cover is not mounted on the top of the container rigidly and stably during operation of the motor, the juice easily sputters outward from the container. In addition, when the user's fingers are placed in the container, the motor will be operated due to unintentional touch of the control switches on the control panel of the motor seat, so that the cutter blades contained in the container are rotated by the operating motor, thereby easily injuring the user's fingers.

SUMMARY OF THE INVENTION

The present invention has arisen to mitigate and/or obviate the disadvantage of the conventional juicer.

The primary objective of the present invention is to provide a juicer having a safe power connection function, wherein when the top cover is not mounted on the top of the container rigidly and stably and when the press member is not in contact with the conductive member, the motor will not be driven to operate, so as to prevent the cutter blades from being rotated due to unintentional touch of the control switches, thereby preventing the user from being injured, and thereby protecting the user's safety.

Another objective of the present invention is to provide a juicer having a safe power connection function, wherein when the top cover is mounted on the top of the container, the press member of the conductive switch mounted on the top cover presses and contacts the conductive member of the conductive switch mounted on the handle, thereby conducting the electric power of the motor seat, so that the power supply circuit for driving operation of the motor in the motor seat is disposed at an energized state. Thus, the user can press the control switches, such as the rotation speed control switch, the start switch or the like, on the control panel of the motor seat, so that the motor mounted in the motor seat is driven to operate, so as to perform the function of the juicer.

A further objective of the present invention is to provide a juicer having a safe power connection function, wherein when the top cover is removed from the top of the container, the press member of the conductive switch mounted on the top cover is detached from the conductive member of the conductive switch mounted on the handle, thereby shutting the electric power of the motor seat, so that the power supply circuit for driving operation of the motor is disposed at an opened state. Thus, even if the user presses the control switches on the control panel of the motor seat unintentionally, the motor mounted in the motor seat will not be driven to operate, thereby preventing the cutter blades from being rotated due to unintentional touch of the switches, and thereby protecting the user's safety.

In accordance with the present invention, there is provided a juicer having a safe power connection function, comprising a motor seat, a fixing ring, a container, an electric wire, a conductive switch, and a top cover, wherein:

the motor seat has an inner wall provided with a first conductive contact;

the fixing ring is mounted in the inner wall of the motor seat and is provided with a second conductive contact and a third conductive contact, the second conductive contact of the fixing ring electrically contacts the first conductive contact of the motor seat;

the container is mounted on the fixing ring and is provided with a handle;

the electric wire is mounted on the handle and has a lower end provided with a fourth conductive contact electrically contacting the third conductive contact of the fixing ring;

the top cover is mounted on a top of the container and has a periphery formed with a protruding ear; and the conductive switch is mounted between the handle and the top cover and includes a conductive member connected to an upper end of the electric wire and mounted on an upper end of the handle, and a press member mounted on the protruding ear of the top cover.

Further benefits and advantages of the present invention will become apparent after a careful reading of the detailed description with appropriate reference to the accompanying drawings.

DETAILED DESCRIPTION OF THE INVENTION

Figure 1:
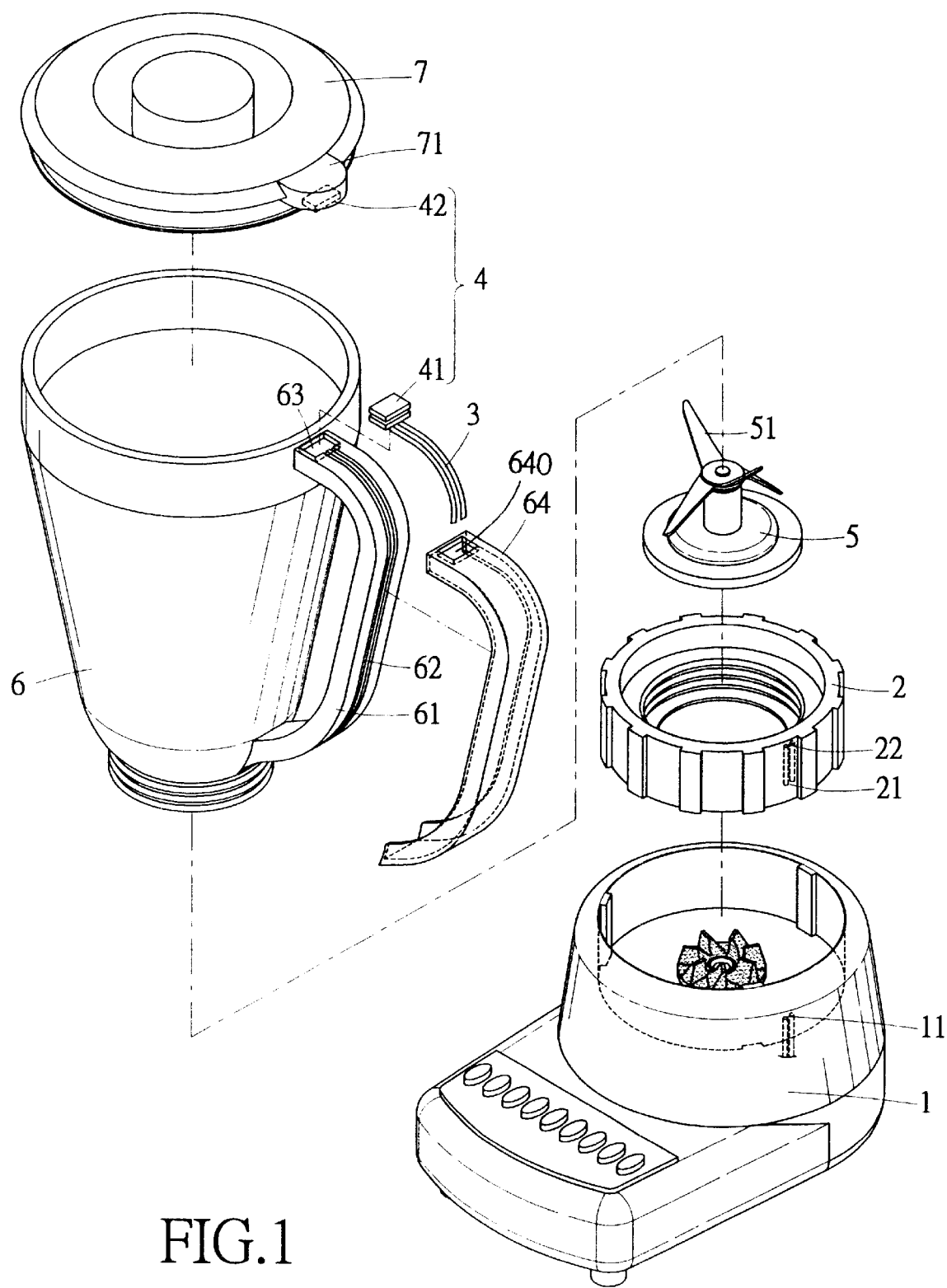
FIG. 1 is an exploded perspective view of a juicer having a safe power connection function in accordance with a preferred embodiment of the present invention.
Figure 2:
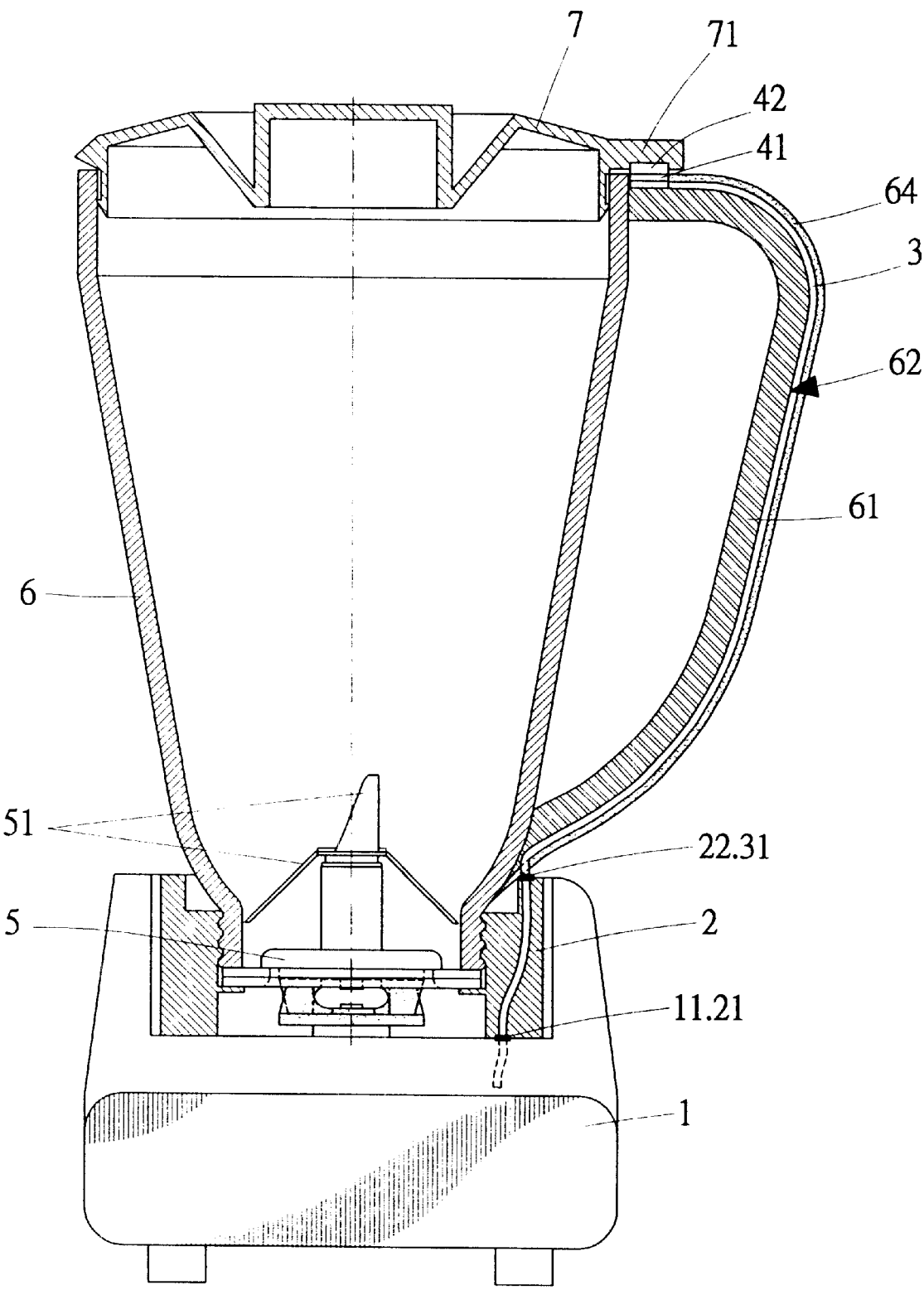
FIG. 2 is a side plan cross-sectional assembly view of the juicer having a safe power connection function as shown in FIG. 1.

Referring to the drawings and initially to FIGS. 1 and 2, a juicer having a safe power connection function in accordance with a preferred embodiment of the present invention comprises a motor seat 1, a fixing ring 2, a blade seat 5, a container 6, an electric wire 3, a conductive switch 4, and a top cover 7.

The motor seat 1 has an inner wall provided with a first conductive contact 11.

The fixing ring 2 is mounted in the inner wall of the motor seat 1 and is provided with a second conductive contact 21 and a third conductive contact 22. The second conductive contact 21 of the fixing ring 2 electrically contacts the first conductive contact 11 of the motor seat 1.

The blade seat 5 is mounted in the fixing ring 2 and is provided with a plurality of cutter blades 51.

The container 6 has a lower end secured in the fixing ring 2. The container 6 is provided with a handle 61 formed with an insertion groove 62. The handle 61 has a top formed with a receiving recess 63.

The electric wire 3 is mounted on the handle 61 and has a lower end provided with a fourth conductive contact 31 electrically contacting the third conductive contact 22 of the fixing ring 2. Preferably, the electric wire 3 is mounted in the insertion groove 62 of the handle 61.

The top cover 7 is mounted on a top of the container 6 and has a periphery formed with a protruding ear 71.

The conductive switch 4 is mounted between the handle 61 and the top cover 7. Preferably, the conductive switch 4 includes a conductive member 41 connected to an upper end of the electric wire 3 and received in the receiving recess 63 of the handle 61, and a press member 42 mounted on the protruding ear 71 of the top cover 7. Preferably, the press member 42 of the conductive switch 4 is a permanent magnet, and the conductive member 41 of the conductive switch 4 is a magnetic reed switch.

The juicer in accordance with the present invention further comprises a protective cover 64 mounted on the handle 61 to enclose the electric wire 3 between the handle 61 and the protective cover 64. Preferably, the protective cover 64 has an upper end formed with a receiving recess 640 for receiving the conductive member 41 of the conductive switch 4.

Figure 3:
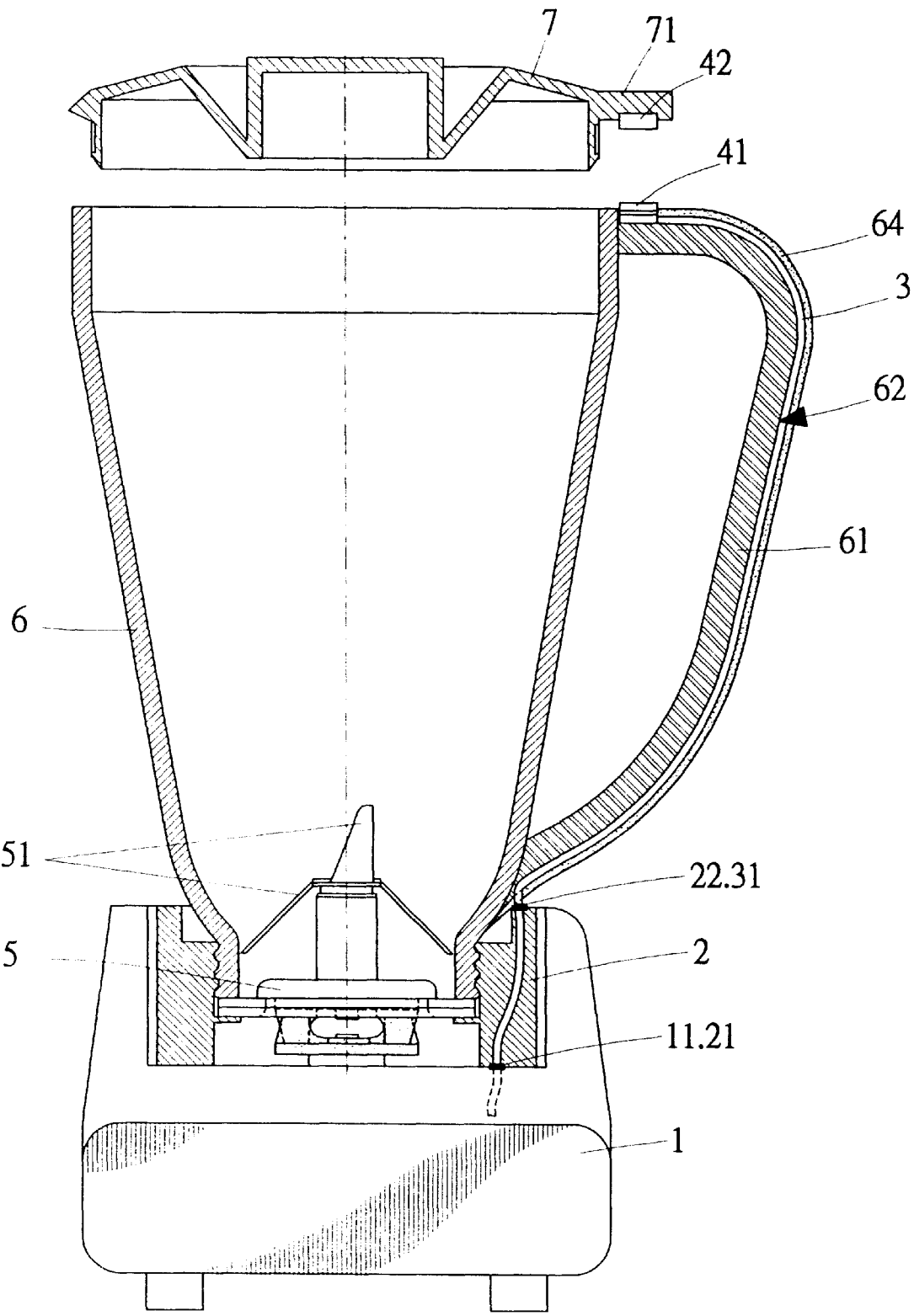
FIG. 3 is a schematic operational view of the juicer having a safe power connection function as shown in FIG. 2 in use.

In operation, referring to FIGS. 1–3, when the top cover 7 is mounted on the top of the container 6 as shown in FIG. 2, the press member 42 of the conductive switch 4 mounted on the protruding ear 71 of the top cover 7 presses and contacts the conductive member 41 of the conductive switch 4 received in the receiving recess 63 of the handle 61, thereby conducting the electric power of the motor seat 1, so that the power supply circuit for driving operation of the motor (not shown) in the motor seat 1 is disposed at an energized state. Thus, the user can press the switches, such as the rotation speed control switch, the start switch or the like, on the control panel of the motor seat 1, so that the motor mounted in the motor seat 1 is driven to operate, so as to perform the function of the juicer.

Alternatively, when the top cover 7 is removed from the top of the container 6 as shown in FIG. 3, the press member 42 of the conductive switch 4 mounted on the protruding ear 71 of the top cover 7 is detached from the conductive member 41 of the conductive switch 4 received in the receiving recess 63 of the handle 61, thereby shutting the electric power of the motor seat 1, so that the power supply circuit for driving operation of the motor (not shown) in the motor seat 1 is disposed at an opened state. Thus, even if the user presses the switches on the control panel of the motor seat 1 unintentionally, the motor mounted in the motor seat 1 will not be driven to operate, thereby preventing the cutter blades 51 from being rotated to injure the user due to unintentional touch of the switches, and thereby protecting the user's safety.

Figure 4:
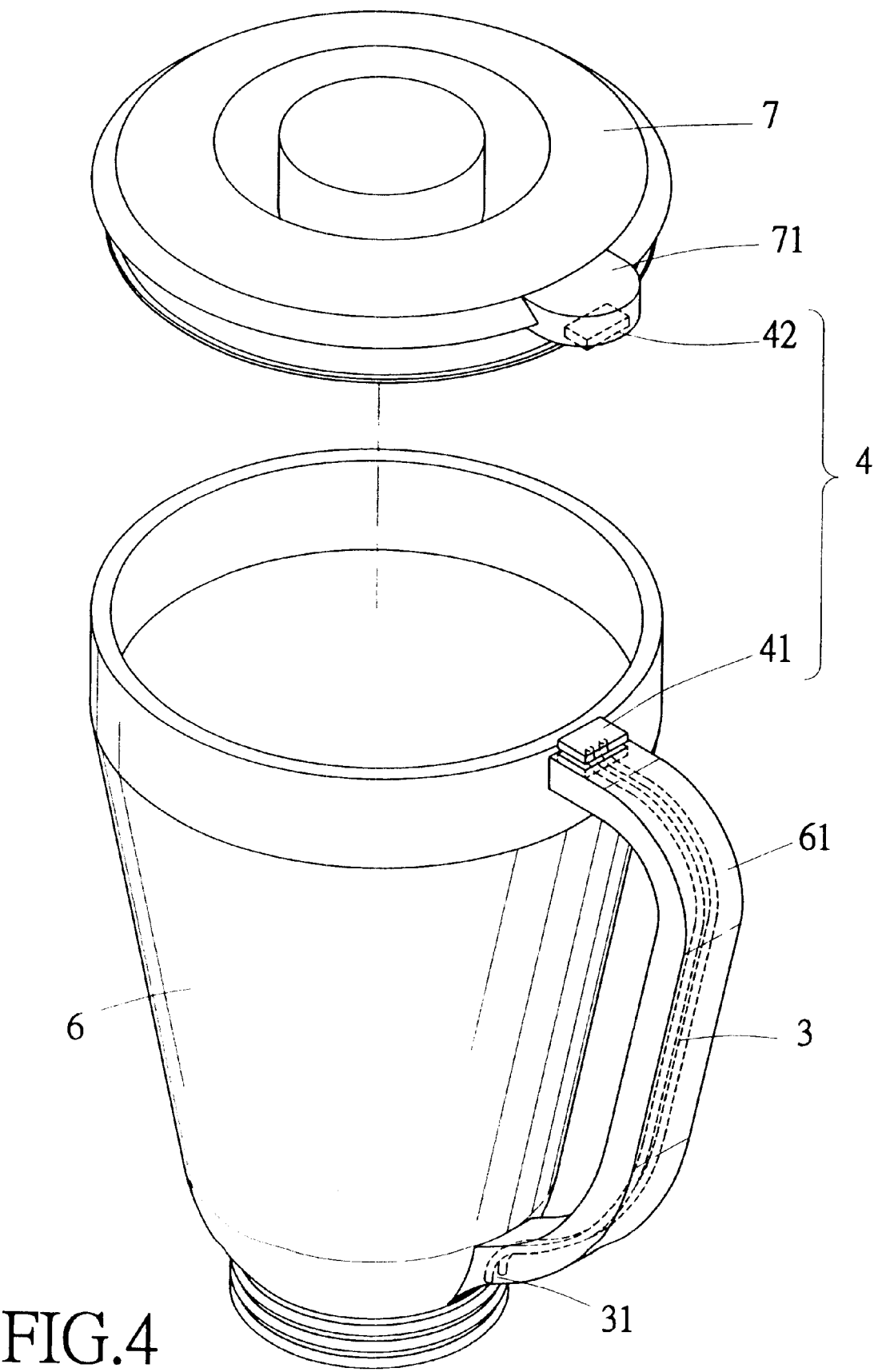
FIG. 4 is a partially exploded perspective view of the juicer having a safe power connection function in accordance with another embodiment of the present invention.
Figure 5:
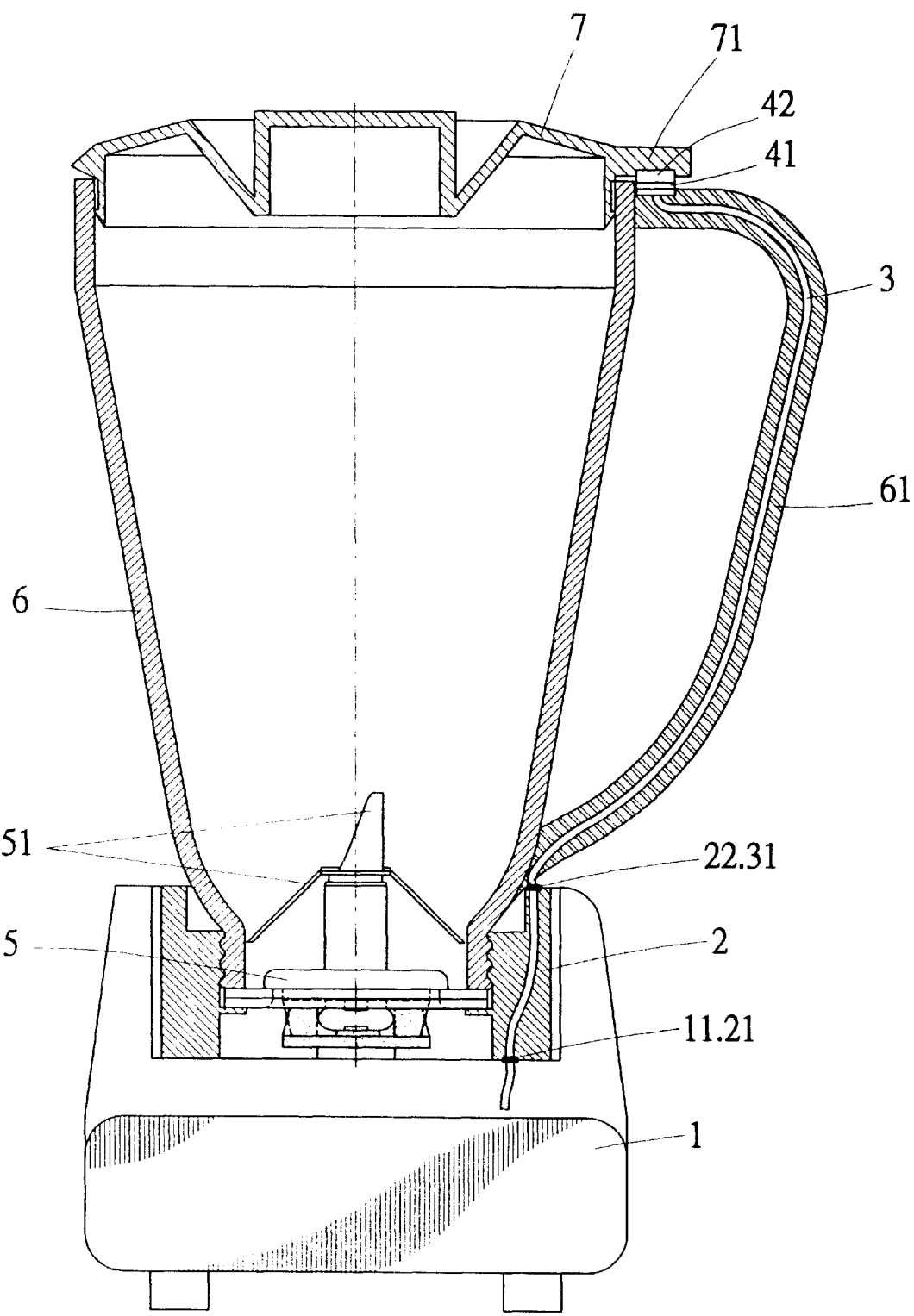
FIG. 5 is a side plan cross-sectional assembly view of the juicer having a safe power connection function in accordance with another embodiment of the present invention.

Referring to FIGS. 4 and 5, the juicer having a safe power connection function in accordance with another embodiment of the present invention is shown, wherein the protective cover 64 is undefined, and the electric wire 3 is coated in the handle 61 integrally. In addition, the conductive member 41 of the conductive switch 4 is connected to the upper end of the electric wire 3 and is secured on the upper end of the handle 61.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A juicer having a safe power connection function, comprising a motor seat, a fixing ring, a container, an electric wire, a conductive switch, and a top cover, wherein:

the motor seat has an inner wall provided with a first conductive contact;

the fixing ring is mounted in the inner wall of the motor seat and is provided with a second conductive contact and a third conductive contact, the second conductive contact of the fixing ring electrically contacts the first conductive contact of the motor seat;

the container is mounted on the fixing ring and is provided with a handle;

the electric wire is mounted on the handle and has a lower end provided with a fourth conductive contact electrically contacting the third conductive contact of the fixing ring;

the top cover is mounted on a top of the container and has a periphery formed with a protruding ear; and the conductive switch is mounted between the handle and the top cover and includes a conductive member connected to an upper end of the electric wire and mounted on an upper end of the handle, and a press member mounted on the protruding ear of the top cover.

2. The juicer having a safe power connection function in accordance with claim 1, wherein the handle is formed with an insertion groove, and the electric wire is mounted in the insertion groove of the handle.

3. The juicer having a safe power connection function in accordance with claim 1, wherein the upper end of the handle is formed with a receiving recess, and the conductive member of the conductive switch is received in the receiving recess of the handle.

4. The juicer having a safe power connection function in accordance with claim 1, wherein the press member of the conductive switch is a permanent magnet.

5. The juicer having a safe power connection function in accordance with claim 1, wherein the conductive member of the conductive switch is a reed switch.

6. The juicer having a safe power connection function in accordance with claim 1, further comprising a protective cover mounted on the handle to enclose the electric wire between the handle and the protective cover.

7. The juicer having a safe power connection function in accordance with claim 6, wherein the protective cover has an upper end formed with a receiving recess for receiving the conductive member of the conductive switch.

8. The juicer having a safe power connection function in accordance with claim 1, wherein the electric wire is coated in the handle integrally.

* * * * *